United States Patent Office

2,828,211
Patented Mar. 25, 1958

2,828,211
PROCESS OF FREEZING AND PACKAGING FOOD

George E. Sanders, Montvale, N. J.

No Drawing. Application February 8, 1956
Serial No. 564,104

8 Claims. (Cl. 99—193)

This invention relates to a frozen food process, and more particularly to a process for bulk freezing vegetables in such a manner that a subsequent volumetric partitioning of the bulk frozen quantity will provide units sufficiently uniform in weight for wrapping and marketing at retail.

In addition to providing a method for securing a substantially uniform retail unit weight, it is the object of this invention to enable bulk freezing operations to be performed during the harvest season with retail unit cutting and packaging operations deferred until a later date.

Another object is to reduce the time of freezing.

Still another object is to permit a more efficient wrapping of a retail package and provide a more appetizing appearance of the frozen food when unwrapped preparatory to using.

Other objects will appear from the description which follows.

Heretofore, in the art of preserving vegetables by freezing, it has been the usual commercial practice to clean, grade, cut, sort, and blanch in bulk, and then cut, weigh, and pack the vegetables in individual retail packages and then freeze. My process calls for bulk freezing, subdividing into retail sized units, and then wrapping the frozen units.

Essentially my process consists in introducing a predetermined drained weight of vegetable into a freezing tray and thereafter lubricating this mass with a quantity of water. In this lubricated condition the mass is spread uniformly in the freezing tray, the excess free water is drained off and subsequently a quantity of water restored to bring the mass in the freezing tray back to a predetermined proportion of drained weight vegetable matter and water.

Specifically, this process may be applied to vegetables such as spinach, green beans, squash, kale and other leafy or pulpy vegetables. Such vegetables, when received at the packing plant, are graded, sorted, cut, washed and blanched (any or all as required) in the conventional manner. At this point, which in the conventional process calls for weighing and packaging before freezing, my process commences.

In detail, a typical application of this process would proceed as follows:

The vegetable mass is drained to a predetermined percentage of free water, and this may be done on a drain conveyor.

The semi-drained mass of vegetable matter is then deposited in a freezer tray which may or may not be lined with wrapper paper and may or may not be coated with a silicone or similar compound to prevent adherence. The amount deposited in each tray is approximately equal to the amount of drained weight of vegetable matter required for each retail package multiplied by the number of retail units planned for each freezing tray. It is important that the freezing tray be of such dimensions that it will hold exactly the right weight of material when filled flush with the top. By providing the freezing tray with a gutter around its periphery, moisture forced out during freezing is trapped.

The tray and contents are weighed and the weight of the contents corrected to the exact drained weight of vegetable matter required for the retail packages by adding or removing the necessary amount of vegetable matter.

Next water is added to the vegetable mass to fill the interstices in the mass, that is, to inundate the mass without causing loss of vegetable matter from the tray, and the vegetable matter is spread uniformly in the freezing tray either manually or mechanically or both, by vibration, agitation, rolling of the top surface, or spreading, patting, stirring, or forking, as required.

After so spreading, a perforated plate is clamped flush over the top of the freezing tray, thus forcing the excess water in the tray up through the perforations, leaving only the vegetable matter and a predetermined acceptable percentage of free moisture in the pan. Raised embossing on the perforated plate, in contact with the vegetable mass in the tray, of suitable design and properly spaced, will provide a trap for moisture which would otherwise be expanded out of the tray due to expansion during freezing, and will also leave each retail unit suitably marked. This draining can be done with the tray in an up or down position, as may be required by the characteristics of the particular vegetable matter being drained.

After draining, the tray and contents are again weighed and enough free water added to bring the contents of the tray to an exact predetermined percentage of gross drained weight of vegetable matter and free moisture.

The tray may be covered with waxed paper, or other protection and then transported to the froster and frozen. It should be noted here that the absence of packaging materials in the froster accelerates the transfer of heat from the vegetable matter to the froster plates, thus reducing the freezing time.

After freezing, the frozen block of vegetable matter is removed from the tray by a steam or hot water bath, and the block either palletized and placed in storage or immediately sent to the cutting operation.

The blocks may be cut into the desired retail sized blocks by a gang saw or any one of a number of well-known cutting tools and methods and thereafter each individual retail size block check-weighed.

The retail size block is then ready for wrapping. The inner waxed paper wrapping is applied and sealed with conventional wrapping and sealing machine equipment. An outer wrapping may then be applied and the package is ready for storage or packing in conventional cartons of one dozen or more units each.

Such a double wrapping gives a more complete seal than the present carton and single sealed waxed paper wrapper now in general use.

By performing the operations described in the various steps a uniform distribution of the vegetable will have been achieved in the freezing tray with a resulting uniformity in density and a retail sized block lying within acceptable weight limits.

Variations and modifications may be made in the steps described without departing from the scope of this invention, and I do not by the foregoing illustration limit such scope.

What I claim is:

1. The method of producing frozen leafy and pulpy vegetables in uniform retail package sizes which comprises filling a freezing tray with a predetermined weight of such a vegetable, adding water to fill the interstices in the vegetable to lubricate the vegetable in order to facilitate uniform spreading, spreading the vegetable uniformly throughout the tray, compressing the vegetable and removing excess water and reducing the tray contents to a predetermined volumetric content and weight, freezing and subdividing into uniformly sized blocks.

2. The method of producing frozen spinach in uniform retail package sizes which comprises filling a freezing tray with a predetermined weight of spinach, adding water to fill the interstices in the spinach to lubricate the spinach in order to facilitate uniform spreading, spreading the spinach uniformly throughout the tray, compressing the spinach and removing excess water and reducing the tray contents to a predetermined volumetric content and weight, freezing and subdividing into uniformly sized blocks.

3. The method of producing frozen leafy and pulpy vegetables in uniform retail package sizes which comprises filling a freezing tray with a predetermined weight of such a vegetable mass, adding water to fill the interstices in the vegetable mass to lubricate the mass in order to facilitate uniform spreading, spreading the vegetable mass uniformly throughout the tray, compressing the vegetable mass to a predetermined thickness and removing excess water, thereby permitting subsequent precise adjustment of the water content by addition thereto, adding water and restoring the tray contents to a predetermined volumetric content and weight, freezing and subdividing into uniformly sized blocks.

4. The method of producing frozen spinach in uniform retail package sizes which comprises filling a freezing tray with a predetermined weight of spinach, adding water to fill the interstices in the spinach to lubricate the spinach in order to facilitate uniform spreading, spreading the spinach uniformly throughout the tray, compressing the spinach to a predetermined thickness and removing excess water, thereby permitting subsequent precise adjustment of the water content by addition thereto, adding water and restoring the tray contents to a predetermined volumetric content and weight, freezing and subdividing into uniformly sized blocks.

5. The method of producing frozen leafy and pulpy vegetables in retail package size which comprises the placing in a freezing tray a mass of such a vegetable of predetermined drained weight, inundating the vegetable mass with water to lubricate the mass in order to facilitate uniform spreading and spreading the same uniformly within the freezing tray, compressing the vegetable mass under uniform loading to a thickness calculated to reduce the free water content of the vegetable mass to an amount below the predetermined allowable free water content of the frozen vegetable, thereby permitting subsequent precise adjustment of the free water content by addition thereto, restoring sufficient free water to bring the total free water up to the predetermined allowable free water content of the frozen vegetable, freezing the vegetable mass and subdividing thereafter into retail package size.

6. The method of producing frozen spinach in retail package size which comprises the placing in a freezing tray of a spinach mass of predetermined drained weight, inundating the spinach mass with water to lubricate the mass in order to facilitate uniform spreading and spreading the same uniformly within the freezing tray, compressing the spinach mass under uniform loading to a thickness calculated to reduce the free water content of the spinach mass to an amount below the predetermined allowable free water content of the frozen spinach, thereby permitting subsequent precise adjustment of the free water content by addition thereto, restoring sufficient free water to bring the total free water up to the predetermined allowable free water content of the frozen spinach, freezing the spinach mass and subdividing thereafter into retail package size.

7. The method of producing frozen leafy and pulpy vegetables in retail package size which comprises the placing in a freezing tray a mass of such a vegetable of predetermined drained weight, inundating the vegetable mass with water to lubricate the mass in order to facilitate uniform spreading and spreading the same uniformly within the freezing tray, compressing the vegetable mass under uniform loading to a thickness calculated to reduce the free water content of the vegetable mass to an amount below the predetermined allowable free water content of the frozen vegetable, thereby permitting subsequent precise adjustment of the free water content by addition thereto, providing the surface of the compressed mass with indentations adapted to trap moisture, restoring sufficient free water to bring the total free water up to the predetermined allowable free water content of the frozen vegetable, freezing the vegetable mass and subdividing thereafter into retail package size.

8. The method of producing frozen spinach in retail package size which comprises the placing in a freezing tray of a spinach mass of predetermined drained weight, inundating the spinach mass with water to lubricate the mass in order to facilitate uniform spreading and spreading the same uniformly within the freezing tray, compressing the spinach mass under uniform loading to a thickness calculated to reduce the free water content of the spinach mass to an amount below the predetermined allowable free water content of the frozen spinach, thereby permitting subsequent precise adjustment of the free water content by addition thereto, providing the surface of the compressed mass with indentations adapted to trap moisture, restoring sufficient free water to bring the total free water up to the predetermined allowable free water content of the frozen spinach, freezing the spinach mass and subdividing thereafter into retail package size.

References Cited in the file of this patent

UNITED STATES PATENTS

| | | |
|---|---|---|
| 1,668,903 | Haslacher | May 8, 1928 |
| 1,955,484 | Birdseye | Apr. 17, 1934 |
| 2,221,220 | Pack | Nov. 12, 1940 |
| 2,504,869 | Noyes | Apr. 18, 1950 |
| 2,651,575 | Guadagni | Sept. 8, 1953 |
| 2,763,557 | Helgerud | Sept. 18, 1956 |

FOREIGN PATENTS

| | | |
|---|---|---|
| 514,792 | Canada | July 19, 1955 |